July 12, 1960   C. E. WEINLAND   2,944,389
ROTATING ROCKET MOTOR AND METHOD OF MAKING SAME
Filed Nov. 20, 1944
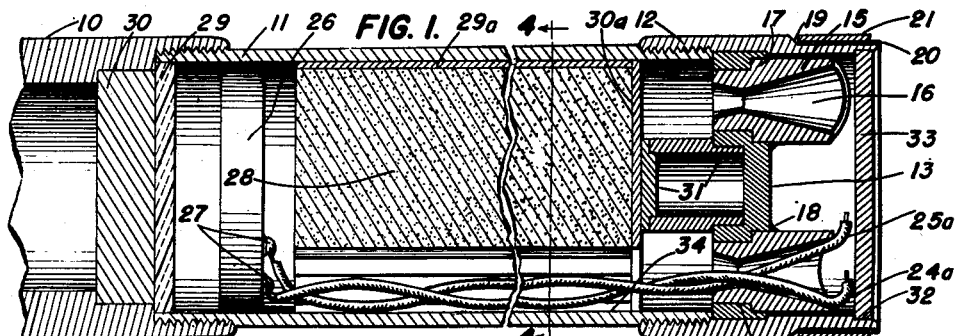
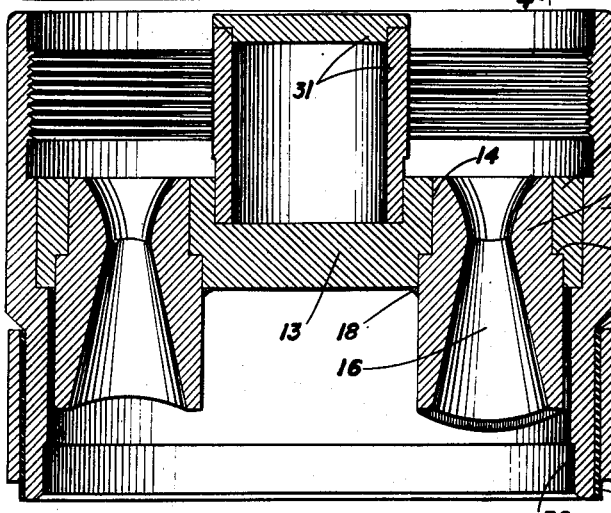
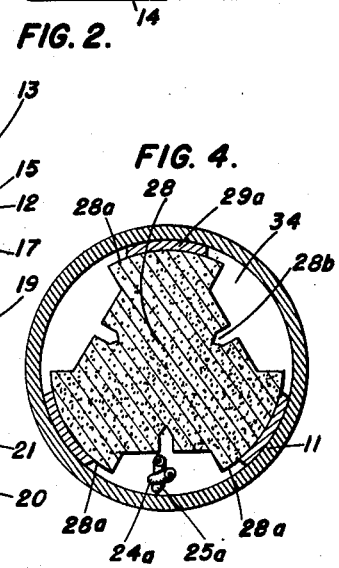
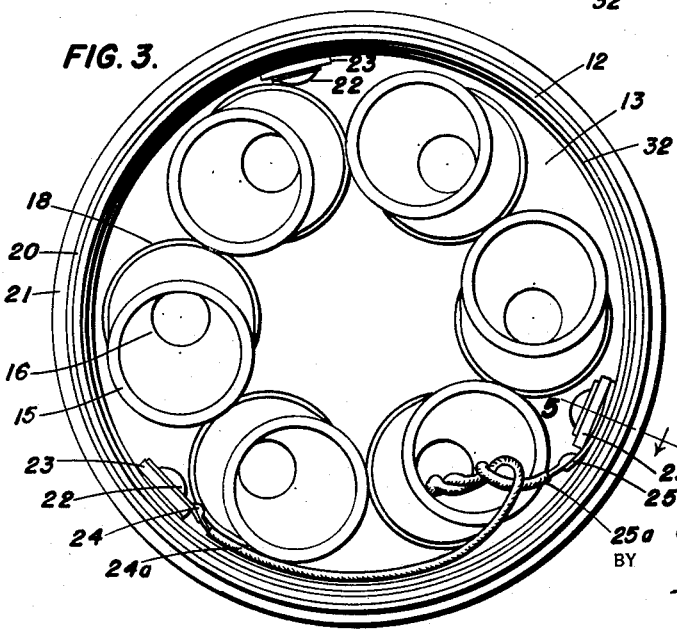
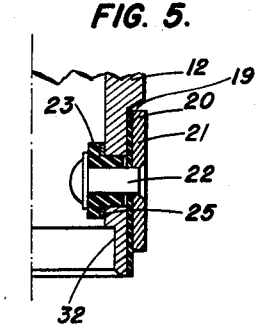
INVENTOR
CLARENCE E. WEINLAND
BY
ATTORNEY United States Patent Office 2,944,389
Patented July 12, 1960

2,944,389
ROTATING ROCKET MOTOR AND METHOD OF MAKING SAME

Clarence E. Weinland, Pasadena, Calif., assignor to the United States of America as represented by the Secretary of the Navy Filed Nov. 20, 1944, Ser. No. 564,337

4 Claims. (Cl. 60—35.6)

This invention relates to rockets and has particular relation to a novel rotating rocket motor having a plurality of jet nozzles for controlling the direction of the jet of exhaust gases resulting from the burning of the propellant, whereby the rocket may be rotated or spun about its longitudinal axis.

It is an object of the present invention to provide a rocket motor having a plurality of nozzles in its base and method of making same, the nozzles being disposed at an angle with respect to the longitudinal axis of the rocket motor whereby the discharging gases from the nozzles impart high speed rotation to the rocket motor.

Another object of the invention is to provide a rocket motor which has particularly stable flight characteristics and an inherently low degree of dispersion.

Still another object of the invention is to provide a rocket motor which obviates the need of fins or similar laterally projecting stabilizing means and is therefore particularly adapted for use in conjunction with automatic or magazine rocket launchers.

A further object of the invention is to provide a rocket motor nozzle construction which is economical of manufacture, particularly in large quantities, as each of the nozzle units may be an automatic screw machine product.

A still further object of the invention is to provide a multiple nozzle rocket motor which has a wide range of application; that is, it may be used for short range rockets of compartively low velocity or for long range high velocity rockets depending upon the quantity of propellant used.

An additional object of the invention is to provide a multiple nozzle rocket motor which lends itself to large diameter construction whereby the rocket motor may be, if desired, equal in diameter to the load it propels; consequently, the rocket motor may be substantially shorter for a given propellant charge or may include a greater quantity of propellant within a given length than has heretofore been feasible.

These and other objects of the invention will be better understood by reference to the accompanying drawing, in which Fig. 1 is a longitudinal sectional view of a multiple nozzle rocket assembly embodying one form of the new motor, with a center portion of the motor tube removed;

Fig. 2 is an enlarged longitudinal sectional view of the nozzle construction shown in Fig. 1;

Fig. 3 is a rear end view of the nozzle construction shown in Fig. 2;

Fig. 4 is a sectional view of the motor tube taken on the line 4—4 of Fig. 1, and Fig. 5 is a fragmentary sectional view of the contact means taken through the line 5—5 of Fig. 3.

Referring to the drawing, the complete rocket assembly includes a head 10 which constitutes the pay load, the head being solid or hollow, and in the latter case containing an explosive and provided with a suitable fuze (not shown).

Attached by screw threads to the rear end of the head 10 is a rocket motor tube 11, and threaded to the rear end of the tube is a nozzle shell or collar 12. The nozzle collar is provided with a transverse nozzle plate 13 which is press-fitted into place and closes the rear end of the motor tube. The nozzle plate is provided with several nozzle holes 14 which, in a preferred form, are equidistant and equally spaced from the center of the plate 13 and are inclined at an angle with respect to the longitudinal axis of the rocket motor tube. Each nozzle hole receives a nozzle unit 15 which is preferably press-fitted into the nozzle hole from the rearward end of the nozzle plate. This is desirable, for during operation of the rocket, the resultant end thrust on the nozzle units is into the rocket motor rather than outward therefrom. Each nozzle unit is in the form of a short tube having a venturi bore 16 therein. In the embodiment shown, the nozzle units 15 are positioned so that their longitudinal axes are inclined at equal acute angles to the face of plate 13, in the same direction clockwise or counterclockwise, and are perpendicular to the respective radii from the motor tube axis to the nozzle axes. The nozzle holes and the nozzle units are provided with corresponding steps or shoulders 17 so as to limit inward movement of the nozzle units. The nozzle plate 13 and the nozzle unit 15, in addition to being press-fitted into place, are preferably furnace copper brazed in place, as shown at 18. However, it will be understood that other retaining means, such as screw-threading, may be employed.

The nozzle collar 12 projects rearwardly a short distance beyond the extremities of the nozzle units and its outside diameter is reduced slightly, as at 19, to receive an electrically insulating ring 20 and a contact ring 21 of conductive material, such as steel or other metal. The rings are held in place by rivets 22 extending radially through the nozzle shell, as shown in Figs. 3 and 5. An insulation washer and collar 23 are provided for each rivet. One of the rivets has a terminal 24 secured directly under its head, while another rivet holds a terminal 25 between the washer 23 and the nozzle collar 12; the terminal 25 thereby being grounded to the motor tube and the terminal 24 being insulated from the nozzle shell and motor tube and connected to the contact ring 21.

Contact lead wires 24a and 25a are connected to the terminals 24 and 25 and extend into the rocket motor tube through one of the nozzle units. The lead wires continue to the forward end of the motor tube through a side passage 34 and connect with an electrically operable igniter 26 by means of terminals 27. The igniter 26 is located in the forward end of the motor tube and is positioned between the forward end of the propellant grain 28 and a thermal insulating closure disc 29 which is mounted behind the base plate 30 of the head. The disc 29 is preferably sealed along its edges by a suitable sealing compound. The igniter is adapted to be energized through the leads 24a and 25a which are electrically connected to the contact ring 21 and the motor tube 11 through the nozzle collar 12. The motor tube is provided with a propellant grain 28 which, as shown in Fig. 4, is preferably a single grain of triform cross section and of smaller diameter than the inner diameter of the motor tube, the grain being centered in the tube by means of supports 29a. A plate 30a, preferably having a cross sectional form and area similar to that of the propellant grain, is mounted snugly between the rearward end of the propellant grain and the closed forward end of a hollow boss 31 secured in the nozzle plate at the center thereof. The boss 31 serves to support the propellant grain clear of the nozzle plates. The supporting plates 29a and 30a preferably comprise combustion inhibitor strips of cellulose acetate or other inhibiting material. In order that the nozzle units be symmetrical with respect to the propellant grain, and thereby facilitate a balanced jet flow through the nozzles, six nozzle units are used with the triform grain. The triform grain has three longitudinal ribs 28a and a recess or groove 28b in the channels 34 defined by the body of the grain, the ribs 28a and the tube 11. With the triform configuration as shown, simultaneous burning takes place in each of the chambers 34 and the grooves 28b, thereby increasing the area of the burning surface as the burning progresses so that the rate of burning accelerates, but without undesirable irregularities. Thus the ribs 28a, although decreasing in area, remain until the burning is practically complete thereby remaining in their original position. The grooves 28b further serve to equalize the burning area of the body of the grain with the burning area of the ribs. It will be apparent that other forms of propellant grain, such as a cylindrical, cruciform or star-shaped grain may be employed. Preferably, the number of nozzles is a multiple of the number of ribs or arms of the grain, if such a form of grain is employed.

The outer end of the nozzle collar 12 is in the form of a skirt which projects beyond the nozzles and has a recess 32 adapted to receive a closure disk 33. The closure disk is relatively light and destructible so that it is readily blown out by the jet blast upon ignition of the rocket motor. The collar serves to protect the nozzle units from damage occasioned during transportation of the rocket assembly and during loading into the rocket launcher or projector from which it is fired. The nozzle collar also provides a means for constructing a compact motor tube which is readily assembled and disassembled. The nozzle collar also makes possible the construction of a compact nozzle assembly, the parts of which are economically constructed by machining of individual components including the collar 12, the nozzle plate 13, the nozzles 15 and the boss 31. The closure disk also seals the rearward end of the motor tube thus preventing the admission of moisture which deteriorates the propellant grain and corrodes the nozzles.

The complete rocket assembly embodying the motor tube of the present invention is adapted to be loaded in and launched from an automatic rocket projector or a magazine type launcher having a current source connectible to contact points engaging the rocket body and the contact ring 21, whereby the igniter 26 may be energized by an electrical circuit through the wires 24a and 25a.

When the igniter 26 is fired, the resulting explosion ignites the propellant grain 28 along its exposed sides to provide uniform burning of the propellant grain, thereby forming a substantially constant pressure of gaseous products of combustion. It will be apparent that the exhaust gases are forced under pressure through the side passages 34 defined by the motor tube and the exposed sides of the propellant grain and are discharged through the venturi orifices 16 of the nozzle units 15.

Because of the angular position of the nozzle units, relative to the longitudinal axis of the motor tube, the reaction of the jets of gas issuing therefrom imparts a rotation to the rocket motor which has been found to reach a maximum in excess of 15,000 revolutions per minute for some rocket assemblies. It will be understood that the speed of rotation of the rocket may be varied not only by changes in the angular relation of the nozzle units to the longitudinal axis of the motor tube, but also by the number of nozzle units which are angularly positioned. In addition, the total number of angularly positioned nozzle units employed and their radial position with respect to the axis of the motor tube will affect the speed of rotation. Because of the stability which such rotation imparts to the rocket, fins or similar stabilizing devices may be eliminated. In fact, they are undesirable in the present motor because of the excessive drag which they cause.

It is desirable that the rocket motor be as large in diameter as possible in order that the nozzle units may be so disposed radially that their leverage or torque is as large as possible with a small angle between the rocket motor axis and the axes of the nozzle units. This is also an advantage for the reason that the head of prior rockets, in order to carry the desired pay load or for other reasons, has heretofore been so great in diameter that it has not been feasible to construct a single nozzle rocket motor of the same diameter for its propulsion. Thus, by the use of the multiple nozzles, and the consequent permissible increase in rocket motor diameter, the rocket motor may be equal in diameter to the head without adding any resistance. The larger diameter offers the further advantage that the length of the propellant grain may be decreased, so that the propellant grain may be stronger and better able to withstand the forces imposed on it during transportation as well as during operation of the rocket motor.

I claim:

1. In combination with a rocket assembly including a motor tube having a forward end and a rear end, a propellant in said tube, igniter means for the propellant mounted in said motor tube, and at least one contact wire leading from said igniter, a nozzle assembly comprising a nozzle plate closing the rear end of said motor tube, said plate having a plurality of holes therein, each set at an angle to the longitudinal axis of said motor tube, a plurality of nozzle units secured in said holes, thereby to impart rotation to said motor tube during burning of the propellant, a collar continuing axially from the rear end of said motor tube beyond said nozzle units, a contact ring externally carried by said collar and insulated therefrom, and means connecting said contact wire to said contact ring.

2. The rocket assembly of claim 1 having a destructible closure plate mounted within said collar and adapted to cover and protect said nozzles against damage.

3. The method of making a nozzle unit adapted to be secured to the rear end of a rocket which comprises the steps of: forming a closure wall for the rear end of the rocket and forming a plurality of angularly spaced apertures transversely through the wall, and in angular relationship to an axis passing substantially perpendicular to the wall at its geometric center, forming a plurality of nozzles to a shape wherein each nozzle has an internal surface which is a curve of revolution about its longitudinal axis and its wall thickness at all angularly spaced points on a section thereof perpendicular to its longitudinal axis is uniform, the opening in each nozzle also being formed so that it is converging in a rearwardly direction from its forward end to a throat of minimum diameter and thence diverging to its rearward end, and individually securing the nozzles so formed in the apertures so formed with the axis of an aperture and axis of the corresponding nozzle coincident.

4. In a tubular rocket device having a transverse wall closing the rear end thereof and an opening extending therethrough through which exhaust gas may flow, a metallic collar extending rearwardly of said transverse wall, a ring surrounding said collar and electrically insulated therefrom, an igniter in the rocket forwardly of said opening, and a pair of electric current conducting wires extending through said opening, the forward ends of said wires being electrically connected to said igniter, the rear end of one of said wires being electrically connected to said collar and the rear end of the other wire being grounded to the device at a point within said collar.

References Cited in the file of this patent

UNITED STATES PATENTS

| 883,892 | Kieser | Apr. 7, 1908 |
| 916,968 | Baldwin | Apr. 6, 1909 |
| 1,243,817 | Crawford | Oct. 23, 1917 |
| 2,504,648 | Chandler | Apr. 18, 1950 |

FOREIGN PATENTS

| 831,487 | France | June 7, 1938 |
| 141,187 | Great Britain | Apr. 15, 1920 |
| 329,229 | Great Britain | May 15, 1930 |